United States Patent [19]

MacKay et al.

[11] Patent Number: 5,305,438
[45] Date of Patent: Apr. 19, 1994

[54] VIDEO STORAGE, PROCESSING, AND DISTRIBUTION SYSTEM USING RECORDING FORMAT INDEPENDENT HIERARCHICAL STORAGES AND PROCESSORS

[75] Inventors: Michael T. MacKay, Vallejo; Donald Morgan, Saratoga, both of Calif.; Matthew R. Adams, Boston, Mass.

[73] Assignee: Sony Electronics Inc., Park Ridge, N.J.

[21] Appl. No.: 885,502

[22] Filed: May 19, 1992

[51] Int. Cl.$^5$ .............................................. G06F 15/62
[52] U.S. Cl. .................................. 395/164; 360/134; 358/310; 395/425
[58] Field of Search .................. 395/164, 162, 425; 358/310, 335, 341, 342; 360/32, 22, 33.1, 27, 131, 134; 340/798, 799; 345/185, 202

[56] References Cited

U.S. PATENT DOCUMENTS

| | | | |
|---|---|---|---|
| 4,164,767 | 8/1979 | Gyi et al. | 360/90 |
| 5,138,388 | 8/1992 | Kamp et al. | 355/251 |
| 5,150,462 | 9/1992 | Takeda | 395/164 |
| 5,163,131 | 11/1992 | Row et al. | 364/DIG. 1 |
| 5,218,672 | 6/1993 | Morgan et al. | 395/164 |

OTHER PUBLICATIONS

David Baron, *CableLabs Lets No Grass Grow*, Digital Media, A Seybold Report, vol. 1, No. 8, Jan. 6, 1992, pp. 16–17.
Gary Kim, *CableLabs RFP a Stage for Digital Ad Insertion*, Multichannel News, May 4, 1992, pp. 97 & 104.
Didier Le Gall, *MPEG: A Video Compression Standard for Multimedia Applications*, Communications of the ACM, Apr. 1991, vol. 34, No. 4, pp. 47–58.

*Primary Examiner*—Dale M. Shaw
*Assistant Examiner*—Kee M. Tung
*Attorney, Agent, or Firm*—Jeffrey J. Blatt

[57] ABSTRACT

A video image storage, processing, and distribution system is provided with a processing and a distribution subsystem. The processing subsystem comprises at least one high performance video signal input device, one recording format independent hierarchy of storage, at least one recording format and resolution independent video data processor, and a high performance digital data recorder. The distribution subsystem comprises an archive library of recording format independent high performance digital tapes and instrument data players, a recording format independent hierarchy of staging storage, at least one recording format independent video distribution control processor, and a RF signal generation subsystem. The hierarchical storage of the processing subsystem comprises a first level of high performance random access mass storage amenable to large volume storage and high performance file transfers, and a second level of high performance random access storage amenable to high performance byte manipulations. The hierarchical staging storage comprises a first level of high performance random access storage amenable to high performance file transfers. Together, these elements cooperate to store, process, and distribute a high volume of video data on demand.

16 Claims, 9 Drawing Sheets

VIDEO STORAGE, PROCESSING, AND DISTRIBUTION SYSTEM USING RECORDING FORMAT INDEPENDENT HIERARCHICAL STORAGES AND PROCESSORS

BACKGROUND OF THE INVENTION

1. Field of the Invention

The present invention relates to the field of video image storage, processing and distribution. More specifically, the present invention relates to video recording formats, and video image storage, processing, and distribution system architectures.

2. Art Background

Figure 1:
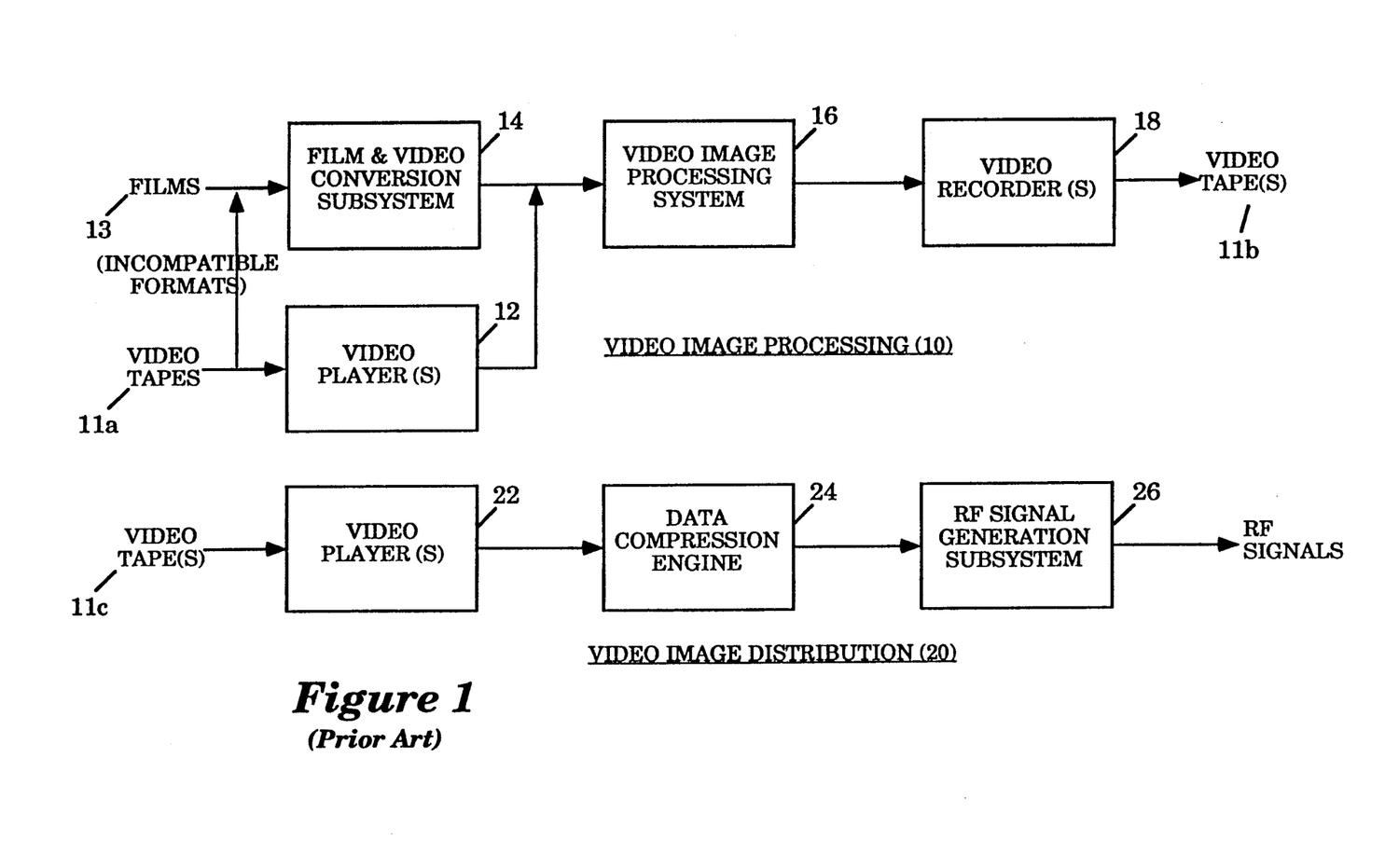
FIG. 1 illustrates a typical prior art video image storage, processing, and distribution system.

FIG. 1 illustrates a typical prior art video image storage, processing, and distribution system. Video images are stored on video tapes 11a. Film images and video images stored on incompatible format tapes are converted to using a film and video conversion subsystem 14. To process video images 10, video signals are generated from video tape players 12 or the conversion subsystem 14 for a video image processing subsystem 16. The video images go through various editing, color correction, noise reduction, and processing steps. The processed video images are then output to a output video recorder 18, and stored onto video tapes 11b. To distribute video images 20, video tapes 11c are played using video players 22, generating video signals for a data compression engine 24. The video signal data are compressed. The compressed video data are in turn provided to a RF signal generation subsystem 26. The output RF signals are then distributed to various video receivers.

Typically, all video image processing as well as distribution equipment is designed to operate in conjunction with a particular video signal recording format. With the advance of video technology and its increased popularity, there has been a proliferation of video recording formats throughout the world. From the ½ inch VHS and Beta formats at one end of the analog spectrum to the 19 mm D1 (CCIR601) and HDVS (SMPTE240 m) formats at the other end of the digital spectrum, there are over a dozen video recording formats used in the industry. As a result, video processing and distribution equipment manufacturers are burdened with manufacturing multiple models for the recording formats they elected to support. Thus, it is desirable to have a video processing and distribution system architecture that can be easily adapted to different video recording formats.

Additionally, while each of the recording formats is different, they all share one thing in common in that formatting data are embedded and intermixed with the video image data. The formatting data must be processed in conjunction with the video image data, thereby increasing processing and distribution time. With the advent of high performance video processing and distribution applications, such as on-demand cable television and on-demand direct satellite broadcast, the additional processing and distribution time has become increasingly undesirable. Thus, it is also desirable to have a video processing and distribution system architecture that can improve processing and distribution performance.

The advent of ISO and ANSI standards for instrument and digital data, ANSI ID-1 and ISO/ANSI DD-1, which have no formatting data embedded and intermixed with the instrument and digital data, provides a new opportunity for achieving improvement in video processing and distribution performance. It is further desirable to have a video processing and distribution system architecture that exploits these standards.

As will be disclosed, the present invention provides a high performance video processing and distribution system architecture that uses recording format independent hierarchical storages and processors, achieving the above described desired results for enhanced performance.

SUMMARY OF THE INVENTION

A video image storage, processing, and distribution system architecture using recording format independent hierarchical storages and processors is disclosed. The video image storage, processing, and distribution system architecture of the present invention has particular application to high performance video image storage, processing, and distribution applications such as on-demand cable television and on-demand direct satellite video distribution. Recording format independent hierarchical storages and processors are provided to a video image storage, processing, and distribution system. The video image storage and processing subsystem comprises at least one high performance video signal input device, one recording format independent hierarchy of storage, at least one recording format and resolution independent video data processor, and a high performance digital data recorder. The video image storage and distribution subsystem comprises one recording format independent hierarchy of storage, at least one recording format independent video distribution control processor, and a RF signal generation subsystem.

The hierarchical storage of the video image storage and processing subsystem comprises a first level of high performance random access mass storage amenable to large volume storage and high speed file transfers, and a second level of high performance random access storage amenable to high speed byte manipulations. The recording format independent processors control the transfer of video signals from the high performance video players to the first level of storage, and the selective transfer of video data from the first level of storage to the second level of storage. Additionally, the processors manipulate the video data stored in the second level of storage to perform video processing such as editing, color correction, noise reduction and bit reduction. Furthermore, the processors control the transfer of processed video data onto the high performance digital data recorders.

The hierarchical storage of the video image storage and distribution subsystem comprises a first level of archival storage amenable to storing very large volume of video data, and a second level of high performance random access mass storage amenable to large volume storage and high speed file transfers. The recording format independent processors control the selective transfer of video data from the first level of storage to the second level of storage, and the selective transfer of video data from the second level of storage to a RF signal generation subsystem. The RF signal generation subsystem in turn generates RF signal and distribute them to the receivers of the video data.

In one embodiment, the hierarchical storage of the video storage and processing subsystem comprises a first level of redundant array of inexpensive drives (RAID), and a second level of solid state random access memory (RAM). The first level of RAID receives video signals from D1 video tape recorders/players (VTRs) under the control of a workstation. The video data stored in the first level RAID are selectively transferred to the second level of RAM under the control of the workstation. The selectively stored video data in the second stage RAM are then accessed by the workstation to perform editing, color correction, noise reduction and bit reduction. The processed data are then output onto a number of ANSI ID-1 compatible instrument data recorders under the control of the workstation.

The hierarchical storage of the video storage and distribution subsystem comprises a first level of ID-1 video tape libraries (VTL), and a second level of RAIDs. The second level of RAIDs receive selective video data from the first level VTLs under the control of a first workstation. The video data stored in the second level of RAIDs are selectively transferred to a number of corresponding satellite uplink signal processing systems (USPSs) of a RF signal generation subsystem under the control of a second workstation. The video data are then transferred from the USPSs to a number of corresponding uplink RF systems, which generate and send RF signals to a satellite. The satellite in turn distributes the RF signals to various receivers of the video data.

BRIEF DESCRIPTION OF THE DRAWINGS

The objects, features, and advantages of the present invention will be apparent from the following detailed description of the preferred embodiment of the invention with references to the drawings in which.

DETAILED DESCRIPTION PRESENTLY PREFERRED AND ALTERNATE EMBODIMENTS

A video image storage, processing, and distribution system architecture using recording format independent hierarchical storages and processors is disclosed. The video image storage, processing, and distribution system architecture of the present invention has particular application to high performance video image storage, processing, and distribution applications such as on-demand cable television and on-demand direct satellite video distribution. In the following description, for purposes of explanation, specific numbers, materials and configurations are set forth in order to provide a thorough understanding of the present invention. However, it will be apparent to one skilled in the art that the present invention may be practiced without the specific details. In other instances, well known systems are shown in diagrammatical or block diagram form in order not to obscure the present invention unnecessarily.

Figure 2:
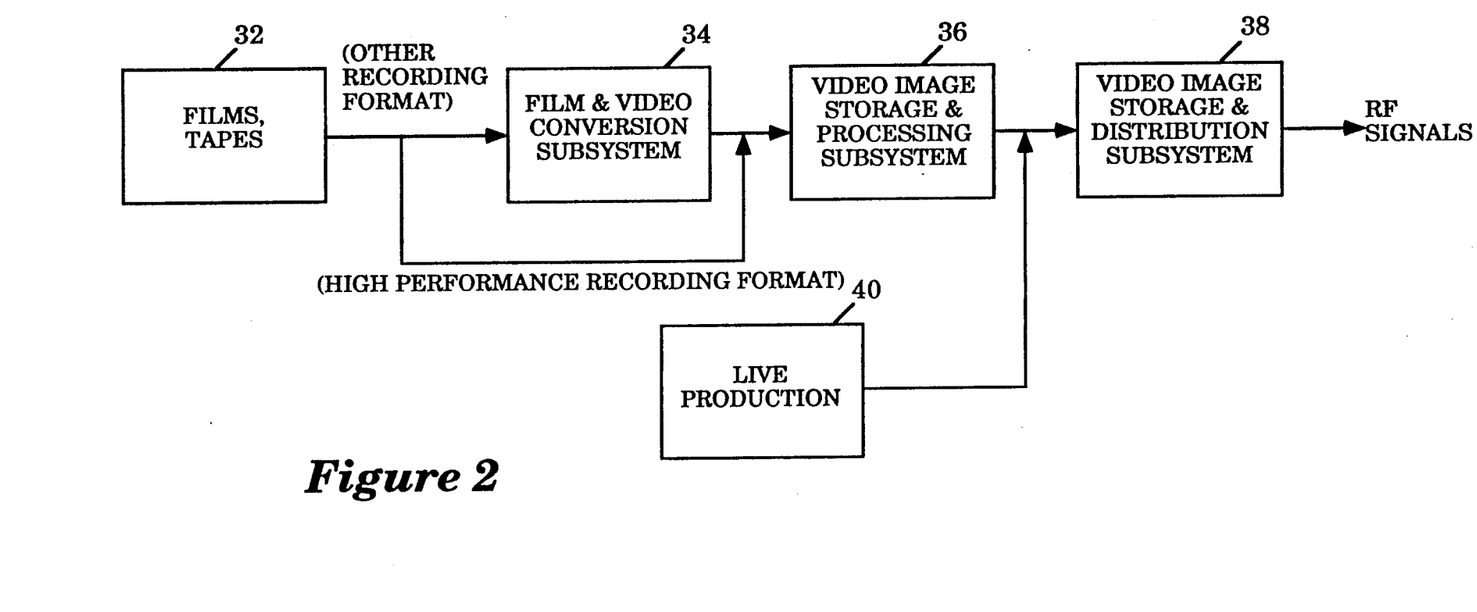
FIG. 2 illustrates a video image storage, processing, and distribution system that incorporates the teachings of the present invention.

Referring now to FIG. 2, a block diagram illustrating a video image storage, processing, and distribution system that incorporates the teachings of the present invention is shown. Shown is a video image storage and distribution subsystem 38 distributing RF signals that incorporates the teachings of the present invention. The video image storage and distribution subsystem 38 receives video image data from either a video image storage and processing subsystem 36 that incorporates the teachings of the present invention or a live production subsystem 40. The video image storage and processing subsystem 36 receives video tapes in a high performance recording format as inputs. Films and video tapes in other recording formats 32 are first converted through the video conversion subsystem 34.

The input film/video tape is intended to represent a broad category of films and video tapes in various recording formats, which are well known and will not be described further. Similarly, the video conversion subsystem 34 and the live production subsystem 40 are also intended to represent a broad category of these subsystems, which are also well known and will not be described further. The video storage and processing subsystem 36 and the video storage and distribution subsystem 38 will be described in further detail below with references to FIGS. 3-4, and 5-6, respectively.

Figure 3:
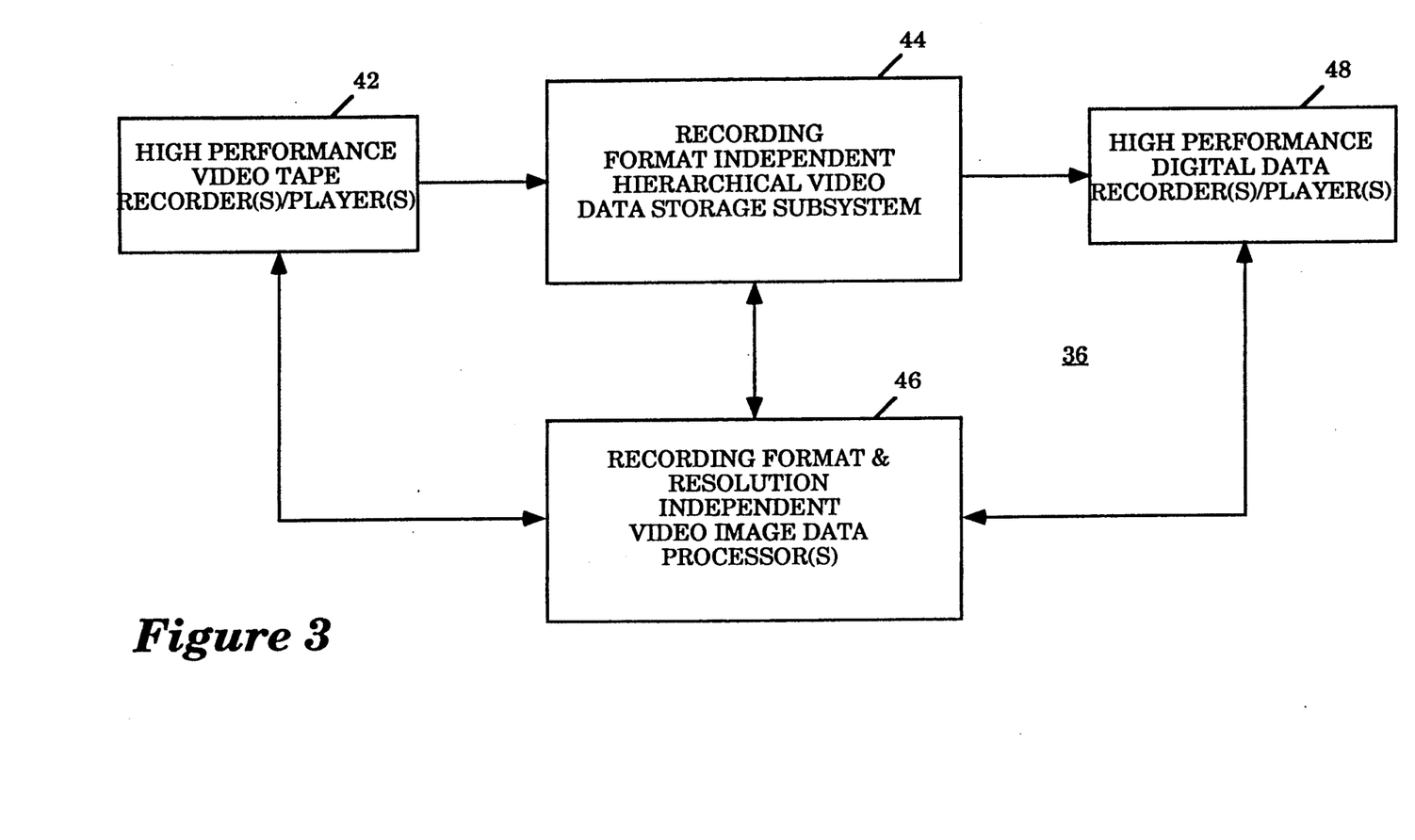
FIG. 3 illustrates the video storage and processing subsystem of FIG. 2 incorporating a recording format independent hierarchical storage subsystem of the present invention.

Referring now to FIG. 3, a block diagram illustrating the video storage and processing subsystem of FIG. 2 is shown. Shown is a recording format independent hierarchical video data storage subsystem of the present invention 44. The hierarchical storage subsystem is coupled to at least one high performance video tape recorder/player (VTR) 42, at least one recording format/resolution independent video image data processor 46, and at least one high performance digital data recorder/player (DDR) 48. The VTRs 42 and the DDRs 48 are also coupled to the video image data processors 46. Together, they cooperate to store and process video image data.

The high performance VTRs 42, DDRs 48, and the processors 46 are intended to represent a broad categories of VTRs, DDRs and processors. Particular examples include D1 format VTRs, ANSI ID-1 compatible instrument data recorders (IDRs) and workstations. Their constitutions and functions are well known. Except for the manner in which they cooperate with the hierarchical storage subsystem 44, they will not be described further in this specification.

The hierarchical storage subsystem 44 comprises a first level of high speed random access mass storage amenable to large volume storage and high speed file transfers, and a second level of high speed random access storage amenable to high speed byte manipulations. While the hierarchical storage subsystem 44 is described herein with two levels of storage, it will be appreciated that the present invention may be practiced with additional levels of storage having complementary improvements in performance characteristics.

Figure 4:
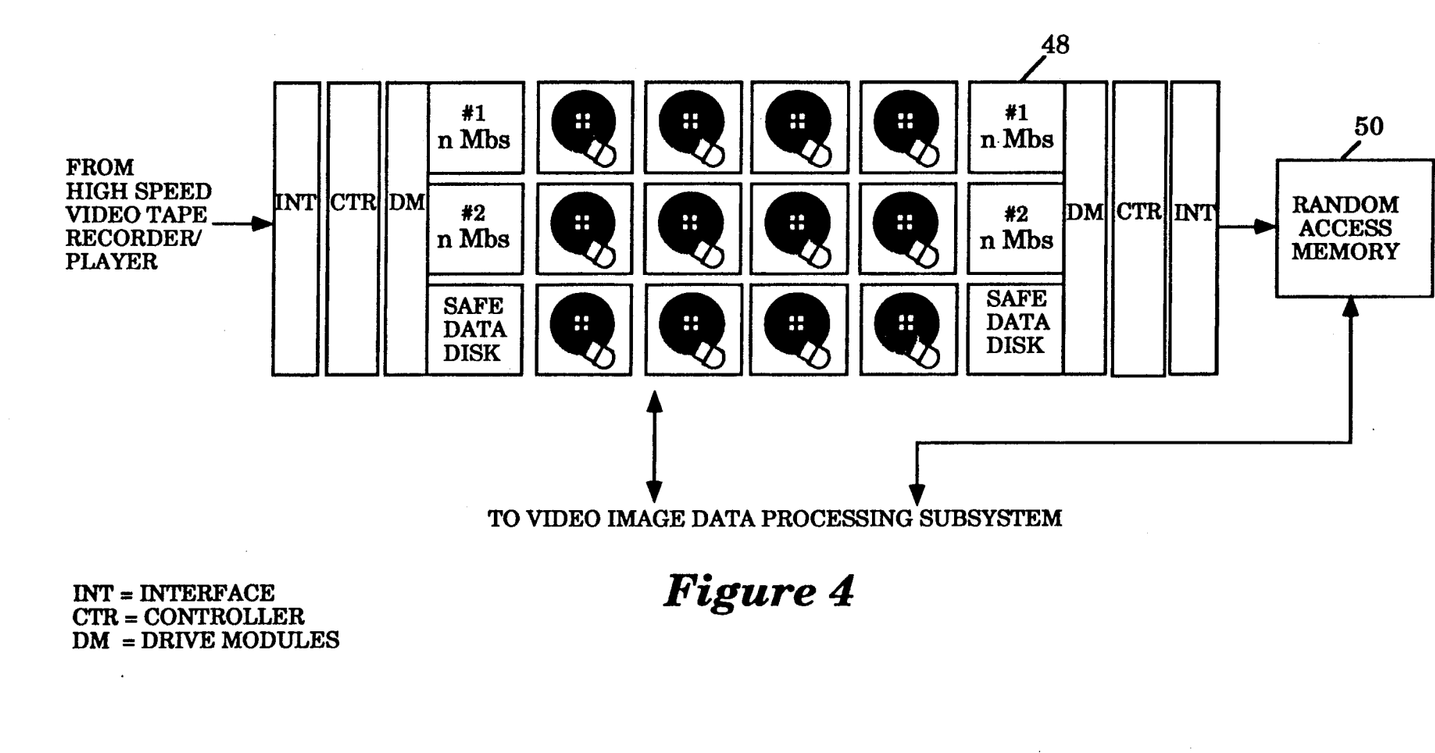
FIG. 4 shows one embodiment of the recording format independent hierarchical storage subsystem of FIG. 3.

FIG. 4 illustrates one embodiment of the recording format independent hierarchical video data storage subsystem of FIG. 3. In this embodiment, the first level of high speed random access mass storage comprises a redundant array of inexpensive drives (RAID) 48. The second level of high speed random access storage comprises random access memory 50, which is well known in the art and will not be described further.

The first level RAID 48 comprises multiple banks of inexpensive drives, providing large volume of storage, in the order of hundreds of MBs. One or more banks are used for safe data keeping. Additionally, the first level RAID 48 comprises dual sets of interface, controller, and drive module, allowing simultaneously input through one set of interface, controller and drive module, and output through the other set. Furthermore, each set of interface, controller and driver module allows high rate of data transfer in the order of tens of mb/sec. For further description of RAIDs, see E. K. Lee, *Software and Performance Issues in the Implementation of a RAID Prototype*, Report No. UCB/CSD 90/573, Computer Science Division, U. of California at Berkeley, 1990.

Alternatively, the first level of high speed random access mass storage may comprise a collection of parallel transfer drives (PTD), and the second level of high speed storage may comprise other types of solid state memory, such as holographs.

Referring back to FIG. 3, the first level of storage receives video signals from the VTRs 42 under the control of the processors 46. The stored data are selectively transferred into the second level of storage, also under the control of the processors 46. The processors 46 access the video data stored in the second level of storage to perform processing such as editing, color correction, noise reduction and bit reduction. The processors 46 receive the recording format of the VTRs as input from an external source. The processed data are transferred back to the first level of storage before transferring onto the DDRs 48. Alternatively, the processed data may be transferred directly from the processors 46 or from the second level of storage.

Figure 5:
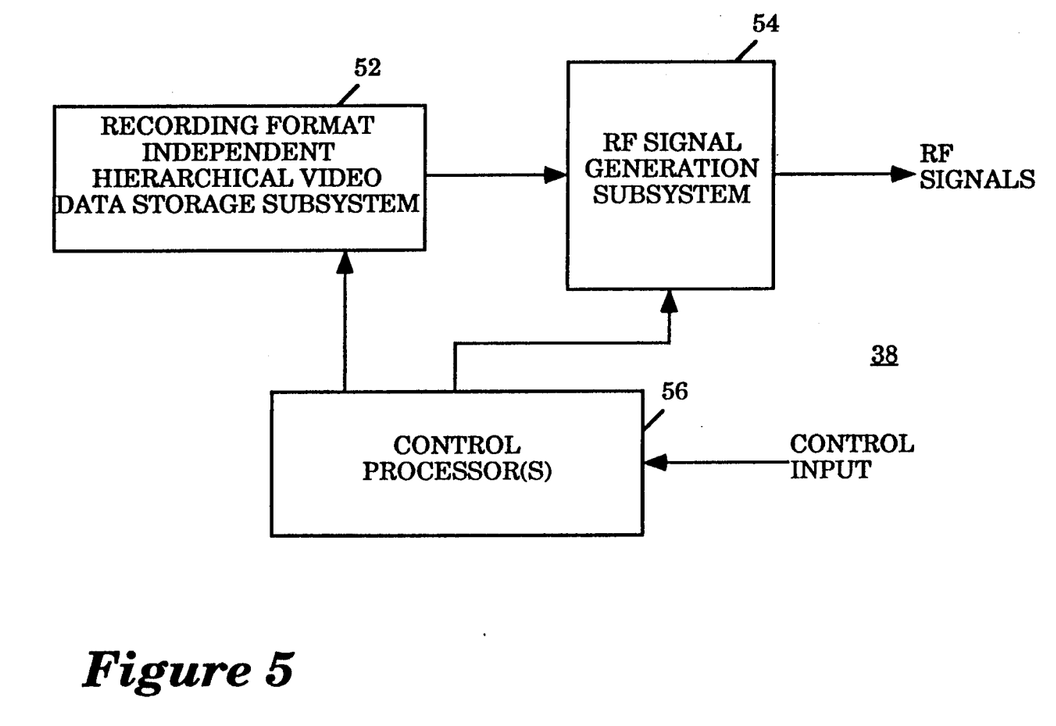
FIG. 5 illustrates the video image storage and distribution subsystem of FIG. 2 incorporating a recording format independent hierarchical storage subsystem of the present invention.

Referring now to FIG. 5, a block diagram illustrating the video image storage and distribution subsystem of FIG. 2 is shown. Shown is a recording format independent hierarchical video data storage subsystem of the present invention 52. The hierarchical storage subsystem 52 is coupled to a RF signal generation subsystem 54 and at least one control processor 56. The RF signal generation subsystem 54 and the control processors 56 are also coupled to each other. Together, they cooperate to store and distribute video.

The RF signal generation subsystem 54 and the control processors 56 are intended to represent a broad category of these subsystems and processors. Their constitutions and functions are well known. Except for the manner these elements cooperate with the hierarchical storage subsystem 52, they will not be described further.

The hierarchical storage subsystem 52 comprises a first level of archival library storage amenable to storing a large volume of video data, and a second level of high speed random access mass storage amenable to large volume of storage and high speed file transfers. While the hierarchical storage subsystem 52 is being described with two levels of storage, it will be appreciated that the present invention may be practiced with additional levels of storage having complementary performance characteristics.

Figure 6:
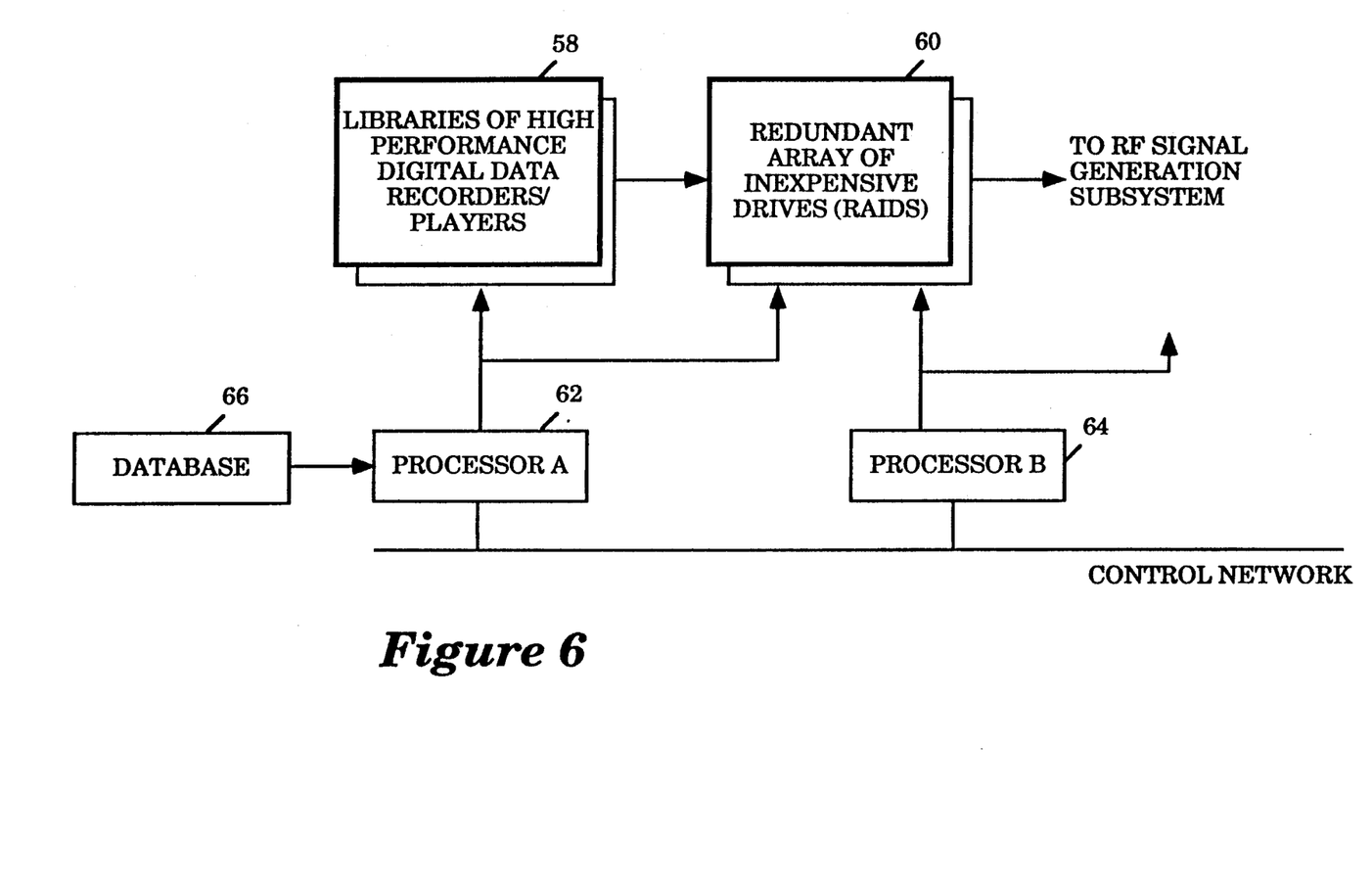
FIG. 6 shows one embodiment of the recording format independent hierarchical storage subsystem of FIG. 5.

FIG. 6 illustrates one embodiment of the recording format independent hierarchical video data storage subsystem of FIG. 5. In this embodiment, the first level of archival library storage comprises at least one library of high performance digital data recorders/players (DDRs) 58, and the second level of high speed random access mass storage comprises at least one redundant array of inexpensive drives (RAID) 60. The high performance video data tapes stored in the first level libraries 58 are catalogued in a database 66. The DDRs and RAIDs are well known in the art and will not be described further. Alternatively, the second level of high speed random access mass storage may comprise a collection of parallel transfer drives (PTD).

The transfer of video data between the first level libraries and the second level RAIDs are controlled by a first processor 62, while the transfer of video data between the second level RAIDs and the RF signal generation subsystem are controlled by a second processor 64. In addition to being coupled to the two stages of storage 58 and 60, both processors 62 and 64 are coupled to a network for receiving control information. The first control processor 62 is also coupled to the database 66, while the second control processor is also coupled to the signal generation subsystem.

Referring back to FIG. 5, the first level of library storage sends video signals from the DDRs to the second level RAIDs under the control of the processors 56. The stored data in the second level RAIDs are selectively transferred to the RF signal generation subsystem 54 also under the control of the processors 56. The processors 56 receive the recording format of the DDRs and video selection information as inputs from external sources. It will be appreciated that once the video data are transferred into the second level RAIDs, they can be transferred to the RF signal generation subsystem 54 repeatedly under the control of the control processors 56, without reloading them from the first level libraries.

Figure 7:
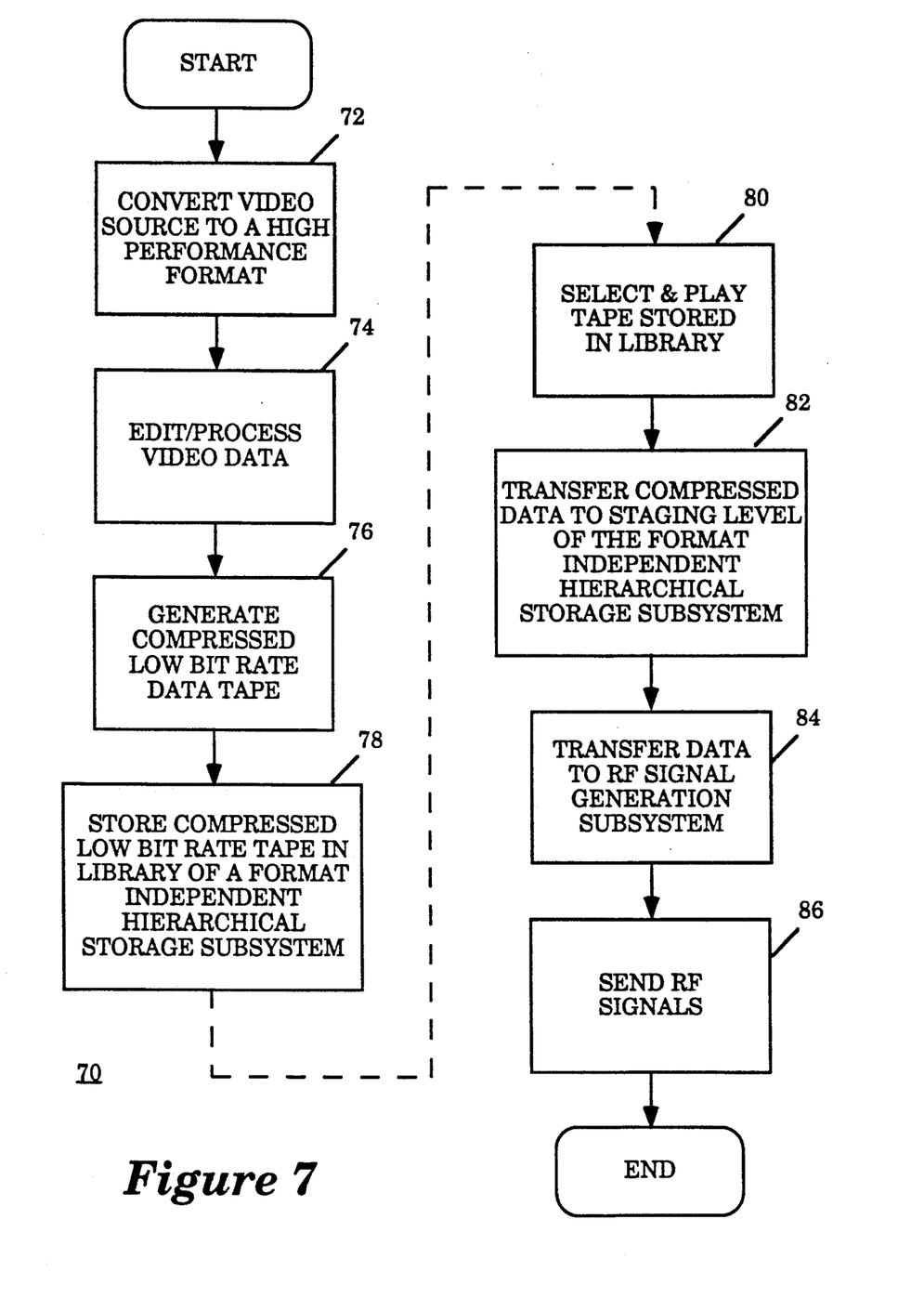
FIG. 7 is a flow diagram of the method of the present invention.

Referring now to FIG. 7, a flow diagram illustrating the method of the present invention for video processing and distribution is shown. Initially, films and videos are converted to a high performance recording format if necessary, block 72. The videos are edited and processed, block 74. In particular, the video data are compressed. Then, a compressed low bit rate data tape is generated, block 76. The compressed low bit rate data tape is then stored in the first level archive library of the hierarchical storage of the video distribution subsystem, and catalogued in the database, block 78.

Upon receipt of control signals requesting a stored video data tape in the first level archive library, the video data tape is played, block 80, and the video data are transferred to the second level high performance random access mass storage, block 82. The stored data in the second level of the hierarchical storage is then transferred to the RF signal generation subsystem, block 84, which in turn generates the RF signals and distributes them accordingly, block 86.

Figure 8A:
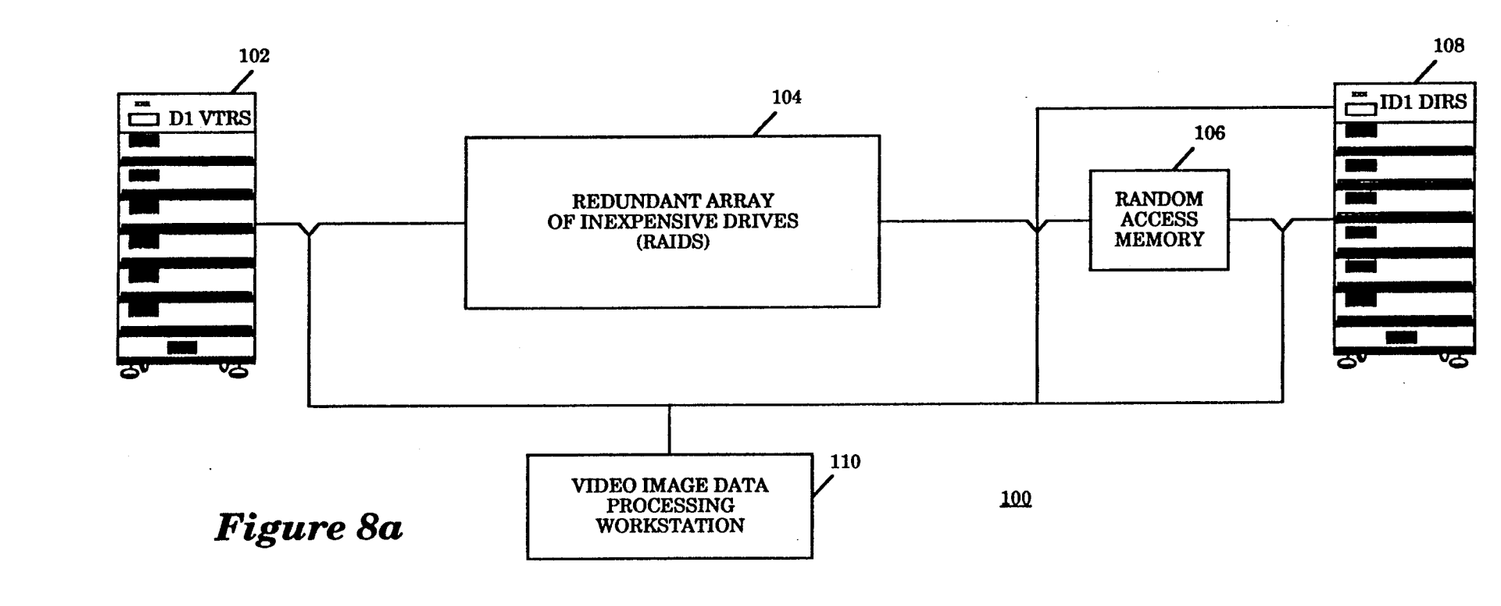
FIGS. 8a-8b illustrate an exemplary application of the present invention to an exemplary high performance on-demand direct satellite video distribution application.
Figure 8B:
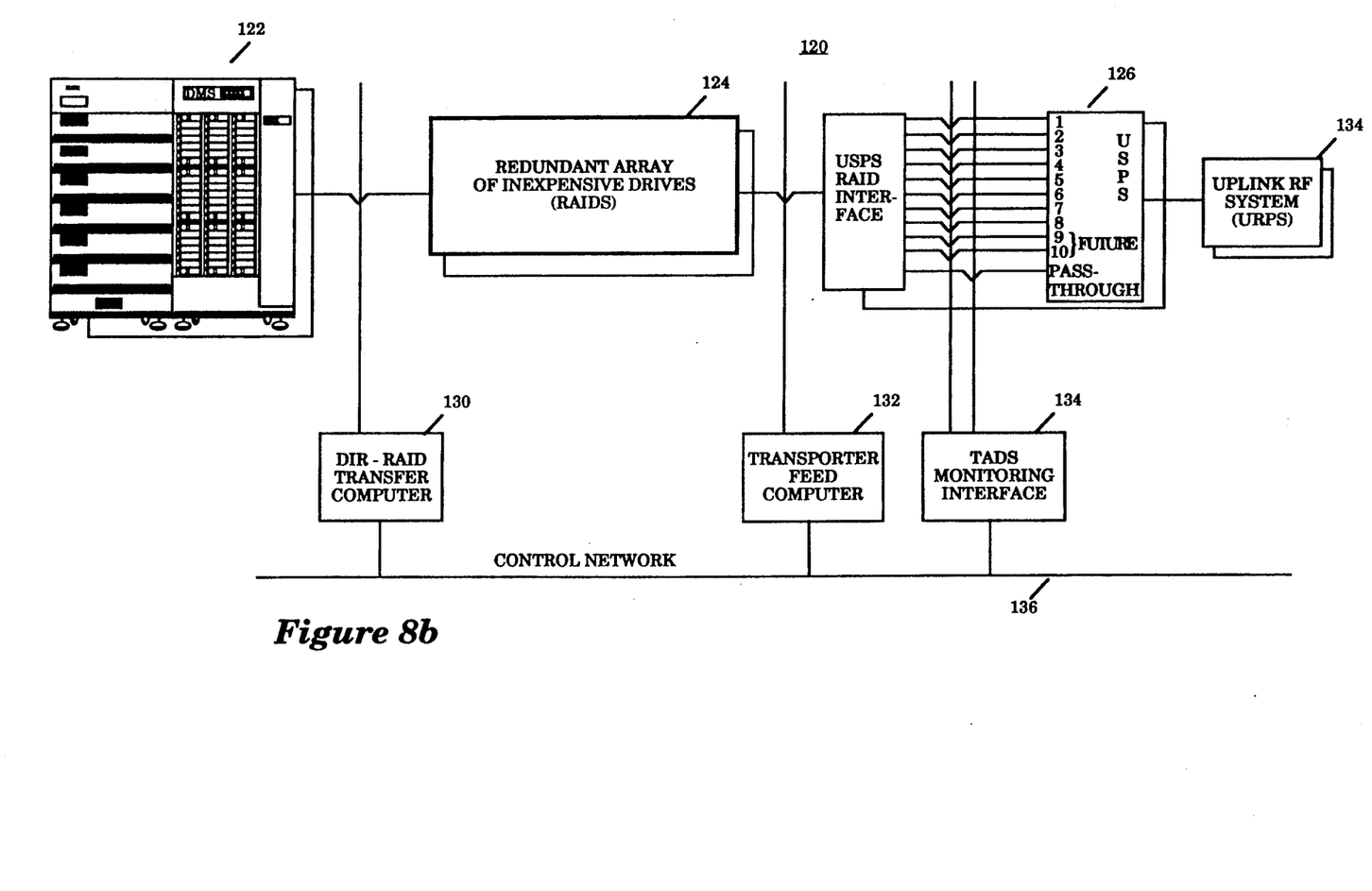

Referring now to FIGS. 8a-8b, two diagrams illustrating an exemplary application of the present invention to a high performance on-demand satellite video distribution system are shown. FIG. 8a illustrates the exemplary video storage and processing subsystem of the exemplary high performance on-demand satellite video distribution system. FIG. 8b illustrate the exemplary video storage and distribution subsystem of the exemplary high performance on-demand satellite video distribution system.

The exemplary video image storage and processing subsystem 100 comprises a number of D1 format VTRs 102, and a number of ANSI ID-1 instrument data recorders 108. The exemplary video storage and processing subsystem 100 further comprises a first level RAID 104, having storage capacity in excess of hundreds of MBs, and a second level of RAMs, having storage capacity in excess of tens of MBs. Lastly, the exemplary video processing subsystem 100 further comprises a workstation 110 coupled to the other elements.

Particular examples of D1 format VTRs and ANSI ID-1 instrument data include SONY's DVR-2100 and DIR-1000. Particular examples of RAIDs include Storage Concepts' Model 51. Particular examples of RAMs include memory products manufactured by Intel, Mortorola and TI. Particular examples of workstations include workstations manufactured by Sun Microsystems, and Helwett Packard. For further descriptions of these products, see product literatures provided by the manufacturers.

The D1 format VTRs 102, are used as input devices, while the ANSI ID-1 instrument data recorders 108, are used as output devices. The workstation 110 controls the data transfer between the various equipments and performs various video image processings. The video data are transferred between the VTRs 102, and the first level RAIDs 104, at bit rate in excess of hundreds of mbs; between the first level RAIDs 104, and the second level RAMs 106, or the ANSI ID-1 instrument data recorders 108, at bit rate also in excess of hundreds of mbs. The video image processings include editing, color correction, noise reduction, and MPEG bit compression.

The exemplary video image storage and distribution subsystem 120 comprises a first level of archival libraries 122, comprising libraries of ANSI ID1 instrument data recorders, and a second level of high performance random access mass storage 124, comprising a number of RAIDs, having storage capacity in excess of tens of GBs. The exemplary video storage and distribution subsystem 120 further comprises a number of uplink signal processing systems, or transponders 126, each composed of a number channels, and a number of corresponding uplink RF systems 128. Lastly, the exemplary video storage and distribution subsystem 120 comprises a number of workstations 130-132, a transponder quality assurance interface 134, and a network 136.

Particular examples of archival libraries 122 include SONY's DMS-600. For further description of SONY's DMS-600, see product literature on DMS-600 provided by SONY Corporation of America.

The archival libraries 122 are used to store a large volume of video data that can be distributed on demand. The USPSs 126, and the uplink RF systems 128, are used to send RF signals to the satellite on demand for distribution. The first workstation 130 is used to control the transfer of data between the instrument data recorders of the archival libraries 122, and the second level RAIDs 124, while the second workstation 132 is used to control data transfer between the second level RAIDs 124, and the transponders 126. The video data are transferred between the instrument data recorders of the archival libraries 122, and the second level RAIDs 124, at bit rates ranging from tens of mbs to hundreds of mbs, and the video data are transferred between the second level RAIDs 124, and the transponders 126, at aggregate bit rate of tens of mbs or individual bit rate in the order of mbs per channel.

It will be appreciated that at these exemplary data transfer rates, a 2 hour video tape generating video signals in hundreds of mbs can be transferred from the first level library to the second level RAID in the order of minutes, and be ready for distribution. Additionally, it will be appreciated that exemplary on-demand satellite distribution system is resolution and frame rate independent. The exemplary system can handle spatial resolutions including $256 \times 256$, $768 \times 482$, and $1920 \times 1035$, temporal resolutions including 33 bits/pixel, 24 bits/pixel, 16 bits/pixels, and compressed equivalent of 1 bit/pixel, and frame rates including 24 frames/sec film, 25 frames/sec PAL video, 29.94 frames/sec NTSC video, 30 frames/sec HDVS SMPTE240M video, subject only to the bandwidth of the instrument data recorders of the first level archival libraries (bandwidth = spatial resolution $\times$ temperal resolution $\times$ frame rate).

While the present invention has been described in terms of presently preferred and alternate embodiments, and an exemplary application, those skilled in the art will recognize that the invention is not limited to the embodiments and the exemplary application described. The present invention can be practiced with modification and alteration within the spirit and scope of the appended claims. The description is thus to be regarded as illustrative instead of limiting on the present invention.

What is claimed is:

1. In a video image storage, processing, and distribution system, a method for processing video image data, said method comprising the steps of:
    a) transferring said video image data from a high performance recording format video tape into a recording format independent hierarchy of storage;
    b) accessing and processing selectively said video image data stored in said recording format independent hierarchy of storage, said selective processing comprising compressing said video image data with a bit reduction technique, and providing formatting data for said video data; and
    c) outputting said processed video image data onto a compressed low bit rate data tape using an instrument data recorder having a recording format where formatting data is segregated from video data.

2. The method as set forth in claim 1, wherein,
    said video image data are stored in a video tape having a recording format other than said high performance recording format;
    said method further comprises the step of d) converting said video tape having a recording format other than said high performance recording format to said high performance recording format, said step d) being performed before said step a).

3. The method as set forth in claim 1, wherein,
    said recording format independent hierarchy of storage in said step a) comprises a first level of high performance recording format independent random access mass storage amenable to large volume of data storage and high performance file transfers, and a second level of high performance recording format independent random access storage coupled to said first level of storage and amenable to byte manipulations;

said transferring in said step a) comprises transferring said video image data into said first level of storage; and said selective accessing in said step b) comprises transferring selected subset of said video image data from said first level of storage into said second level of storage.

4. The method as set forth in claim 1, wherein, said high performance recording format in said step a) is D1 recording format;

said bit reduction technique in said step b) is MPEG bit reduction; and said recording format in said step c) is ANSI ID-1 instrument data recording format.

5. In a video image storage, processing, and distribution system, a method for distributing video data, said method comprising the steps of:

a) storing and cataloguing said video data in an archive library of instrument data tape players and transferring selectively said stored and catalogued video data from said archive library to a recording format independent hierarchy of staging storage, wherein said archive library of instrument data tape players comprises digital tapes having a high performance digital recording format where formatting data is segregated from video data, and further wherein said recording format dependent hierarchy of staging storage is amenable to large volume storage and high performance file transfers;

b) said storing and cataloguing said video data includes recording said video onto digital tapes in said high performance digital recording format, storing said digital tapes into said archive library of instrument data tape players, and cataloguing said stored digital tapes;

c) transferring said video data from said hierarchy of staging storage to a RF signal generation subsystem coupled to said hierarchy of storage, while providing formatting data to said video data;

d) said selective transfer in said steps a) and c) comprises selecting one of said stored digital tapes having said video data, playing said selected digital tape, transferring and staging said video data in said staging storage, and transferring said video data from said staging storage to said RF signal generation subsystem; and e) generating and sending RF signals to receivers of said video data.

6. The method as set forth in claim 5, wherein, said archive library of instrument data tape players in said step a) comprises at least one library of said digital tapes;

said high performance digital recording format of said digital tapes in said step a) is ANSI ID-1 instrument data recording format;

said digital players of said archival library in said step a) are ANSI ID-1 instrument data recording format compatible data tape players;

said staging storage in said step a) comprises at least one redundant array of inexpensive drives.

7. The method as set forth in claim 6, wherein, said recording format independent hierarchy of staging storage in said step a) further comprises a second level of high performance recording format independent random access storage amenable to high performance byte manipulations;

said transferring of said video data from said staging storage to said RF signal generation subsystem in said step b) further comprises transferring said video data from said at least one redundant array of inexpensive drives to said second level of random access storage, and from said second level of random access storage to said RF signal generation subsystem.

8. The method as set forth in claim 7, wherein, said second level of random access storage in said step a) comprises solid state memory.

9. In a video image storage, processing, and distribution system, an apparatus for processing video image data, said apparatus comprising:

a) high performance video tape playing means for outputting said video data from a high performance recording format video tape;

b) a recording format independent hierarchy of storage coupled to said high performance video tape playing means for receiving and storing said video data;

c) processor means coupled to said high performance video tape playing means and said recording format independent hierarchy of storage for controlling said outputing, receiving and storing of said video data, and for accessing and processing selectively said stored video data, said selective processing comprising compressing said video data with a bit reduction technique, and providing formatting data for said video data; and d) high performance digital data recording means coupled to said recording format independent hierarchy of storage and said processor means for receiving said processed video data onto a compressed low bit rate data tape having a recording format where formatting data is segregated from video data, said processed video data being output from a selected one of said hierarchy of storage and said processor means, under the control of said processor means.

10. The apparatus as set forth in claim 9, wherein, said video data are stored in a video tape having a recording format other than said high performance recording format;

said apparatus further comprises conversion means for converting said video tape having a recording format other than said high performance recording format to said high performance recording format.

11. The apparatus as set forth in claim 9, wherein, said recording format independent hierarchy of storage comprises a first level of high performance recording format independent random access mass storage amenable to large volume storage and high performance file transfers, and a second level of high performance recording format independent random access storage coupled to said first level of storage and amenable to byte manipulations;

said high performance video playing means outputs said video data into said first level of storage, said first level of storage being coupled to said high performance video playing means; and said processor means causes said selected subset of said video data to be transferred from said first level of storage into said second level of storage before accessing and processing said video data, said processor means being coupled to said first and second levels of storage.

12. The apparatus as set forth in claim 9, wherein,
said high performance recording format is D1 recording format;
said bit reduction technique is MPEG bit reduction; and
said recording format is ANSI ID-1 instrument data recording format.

13. In a video image storage, processing, and distribution system, an apparatus for distributing video data, said apparatus comprising:
a) an archive library of instrument data tape players and a recording format independent hierarchy of staging storage for storing said video data, wherein said archive library of instrument data tape players comprises digital tapes having a high performance digital recording format such that formatting data is segregated from video data, and said recording format independent hierarchy of staging storage is amenable to large volume storage and high performance file transfers;
b) database means comprising a database for cataloguing said stored video data,
said video data are recorded onto a digital tape in said high performance digital recording format, said digital tape being stored into said archive library of instrument data tape players, and catalogued in said database;
c) RF signal generation subsystem coupled to said hierarchy of storage for selectively receiving said stored and catalogued video data, generating and sending RF signals to receivers of said selected video data, said digital tape being played when said video data are selected, said video data being transferred and staged in said staging storage before being transferred to said RF signal generation subsystem, and
d) processor means coupled to said hierarchy of storage, said database means and said RF signal generation means for controlling said selective transfer of said stored and catalogued video data from said hierarchy of storage to said RF signal generation subsystem, while being provided with formatting data of said video data.

14. The apparatus as set forth in claim 13, wherein,
said archive library of instrument data tape players comprises at least one library of said digital tapes;
said high performance digital recording format of said digital tapes is ANSI ID-1 instrument data recording format;
said digital players of said archival library are ANSI ID-1 instrument data recording format compatible data tape players;
said staging storage comprises at least one redundant array of inexpensive drives.

15. The apparatus as set forth in claim 14, wherein,
said recording format independent hierarchy of staging storage further comprises a second level of high performance recording format independent random access mass storage amenable to high performance byte manipulations;
said video data being transferred from said at least one redundant array of inexpensive drives to said second level of random access storage before being transferred to said RF signal generation subsystem.

16. The apparatus as set forth in claim 15, wherein, said second level of random access storage comprises solid state memory.

* * * * *